SUBSCRIPTION TELEVISION SYSTEM

Original Filed April 9, 1952 6 Sheets-Sheet 1

GEORGE V. MORRIS
ERWIN M. ROSCHKE
WALTER S. DRUZ
BERTRAND J. MILLER
*INVENTORS.*

BY Francis W. Crotty
THEIR ATTORNEY.

SUBSCRIPTION TELEVISION SYSTEM

Original Filed April 9, 1952 6 Sheets-Sheet 2

GEORGE V. MORRIS
ERWIN M. ROSCHKE
WALTER S. DRUZ
BERTRAND J. MILLER
*INVENTORS.*

BY Francis W. Crosby

THEIR ATTORNEY.

SUBSCRIPTION TELEVISION SYSTEM

Original Filed April 9, 1952 6 Sheets-Sheet 3

GEORGE V. MORRIS
ERWIN M. ROSCHKE
WALTER S. DRUZ
BERTRAND J. MILLER
*INVENTORS.*

BY Francis W. Crosby

THEIR ATTORNEY.

SUBSCRIPTION TELEVISION SYSTEM

Original Filed April 9, 1952 6 Sheets-Sheet 4

GEORGE V. MORRIS
ERWIN M. ROSCHKE
WALTER S. DRUZ
BERTRAND J. MILLER
*INVENTORS.*

BY Francis W. Crosby

THEIR ATTORNEY.

SUBSCRIPTION TELEVISION SYSTEM

Original Filed April 9, 1952 6 Sheets-Sheet 5

GEORGE V. MORRIS
ERWIN M. ROSCHKE
WALTER S. DRUZ
BERTRAND J. MILLER
*INVENTORS.*

BY Francis W. Crosby

THEIR ATTORNEY.

SUBSCRIPTION TELEVISION SYSTEM

Original Filed April 9, 1952 6 Sheets-Sheet 6

GEORGE V. MORRIS
ERWIN M. ROSCHKE
WALTER S. DRUZ
BERTRAND J. MILLER
*INVENTORS.*

BY Francis W. Crosby

THEIR ATTORNEY.

United States Patent Office

Re. 25,837
Reissued Aug. 10, 1965

25,837

SUBSCRIPTION TELEVISION SYSTEM

George V. Morris, Chicago, Erwin M. Roschke, Des Plaines, Walter S. Druz, Bensenville, and Bertrand J. Miller, Mount Prospect, Ill., assignors to Zenith Radio Corporation, a corporation of Delaware Original No. 2,843,656, dated July 15, 1958, Ser. No. 281,418, Apr. 9, 1952. Application for reissue Feb. 1, 1960, Ser. No. 6,037

36 Claims. (Cl. 178—5.1)

Figure 1:
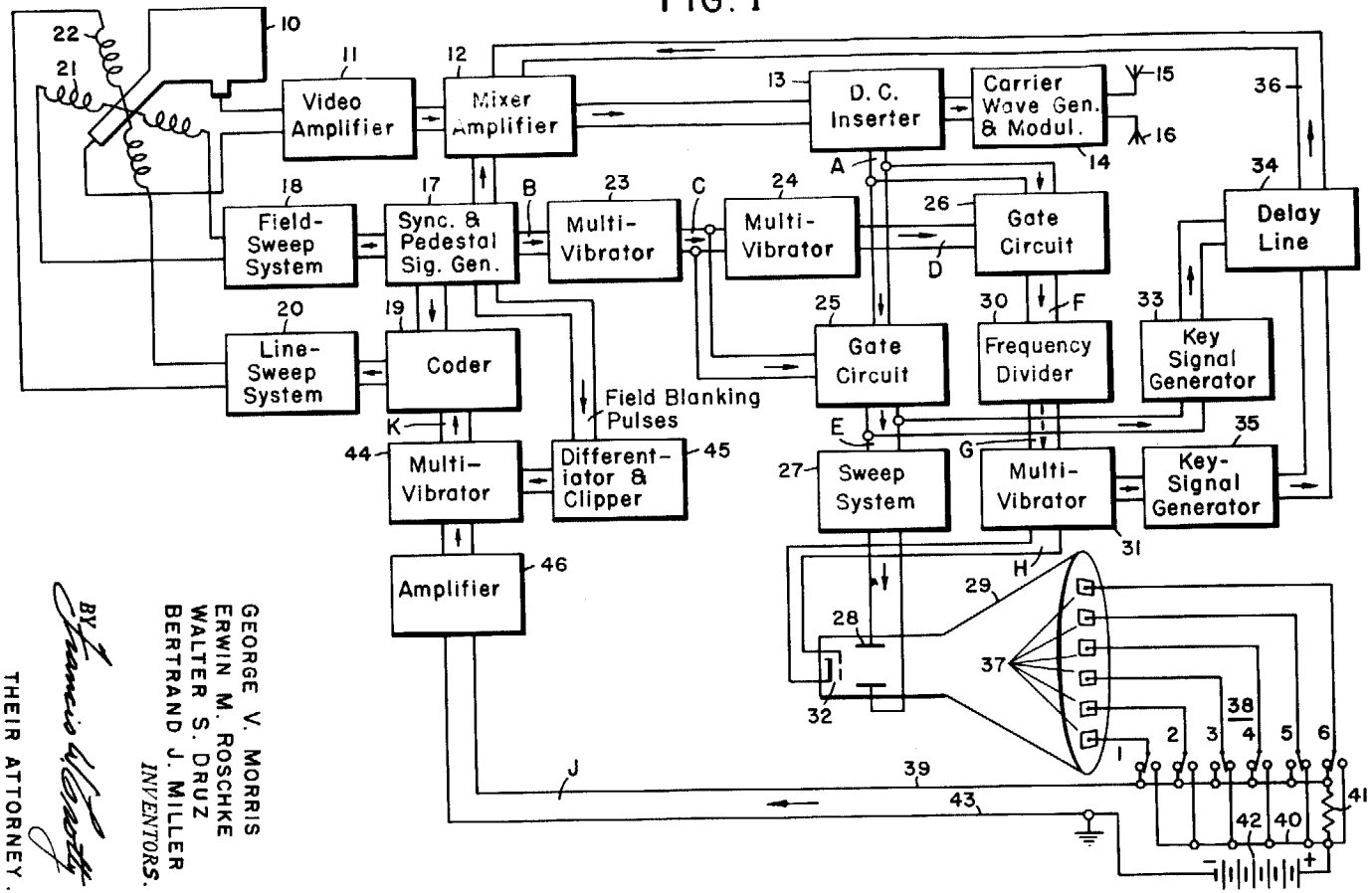

Matter enclosed in heavy brackets [ ] appears in the original patent but forms no part of this reissue specification; matter printed in italics indicates the additions made by reissue.

This invention relates to subscription television systems in which a television signal is transmitted in coded form to be utilized only in subscriber receivers equipped with decoding devices controlled in accordance with the coding schedule employed at the transmitter.

Since the invention may be practiced in either a transmitter or receiver, the term "encoding" is used herein in its generic sense to encompass either coding at the transmitter or decoding at the receiver.

Subscription television systems have been proposed in which a television signal is coded in accordance with a selected coding schedule at the transmitter and in which a key signal, indicating the coding schedule of the telecast, is disseminated to subscriber receivers over a signal channel which may be closed wire circuit, such as existing telephone lines. Systems of this type are disclosed and claimed in Patent 2,510,046, issued May 30, 1950, in the names of Ellett et al., and in Patent 2,547,598, issued April 3, 1951, in the name of Roschke, both of which are assigned to the present assignee.

The use of a closed wire circuit for distributing the key signal to subscriber receivers is advantageous because it provides maximum secrecy and facilitates assessing subscription fees. Nevertheless, the key signal may be transmitted as a modulation component of the coded television signal itself or over any other link but, when this expedient is resorted to, the key signal preferably should not be a direct manifestation of the coding schedule of the telecast, otherwise it is too easily appropriated by unauthorized persons for decoding purposes.

Copending application Serial No. 249,262, filed October 2, 1951, in the name of Walter S. Druz, entitled "Subscription Television System," and assigned to the present assignee, now abandoned, discloses and claims a subscription television system in which an airborne key signal is distributed to subscriber receivers but the airborne signal conveys only a portion of the coding schedule information, the remainder of this information being supplied locally at the subscriber receivers themselves or by some other means. Such a key signal may be distributed as a modulation component of the coded television signal without any great possibility of its being used for unauthorized purposes.

In still other prior systems, the coding schedule for a given program interval is set up in the decoding apparatus of the receiver which then functions independently of the transmitter except as to synchronization. However, it is more desirable to have an established link between the transmitter and the receivers in order that at least a portion of the information concerning the coding schedule may be transmitted to the receivers, as taught in the Druz application and in the aforementioned patents. The existence of such a link permits the coding schedule to be random rather than repetitive, while, at the same time, insuring that the decoder of the receiver may continuously decipher the coded telecast. A random coding schedule renders unauthorized decoding of the transmission extremely difficult, if not virtually impossible, and enhances the secercy aspects of the system.

In the improved subscription television system of this invention, the encoding apparatus included in the transmitter and/or in the various receivers has a plurality of operating conditions for establishing a corresponding plurality of operating modes in the system. An actuating system is coupled to the encoding apparatus and responds to the code pattern of an applied control signal selectively to actuate the encoding apparatus to one of its operating conditions as determined by the code pattern. The control signal is derived during each of a multiplicity of mode-determining intervals, each of which may be a portion of a field-retrace interval, and includes a series of N components collectively representing a particular code pattern which determines the mode of operation of the system for the ensuing interval. When the code pattern of the control signal varies from one mode-determining interval to another, the mode of operation of the system likewise varies so that the television signal is effectively encoded.

When a closed link is used between the transmitter and receiver, such as suggested in the aforesaid Ellett and Roschke patents, a key signal representing the abovementioned control signal may be disseminated to the receivers over such a link and used threat to establish operating modes in each receiver coinciding with the operating modes at the transmitter so that the receivers may effectively decode and utilize the television signal.

When the decoding or key-signal information is distributed as a modulation component of the coded television signal or by any other open link, as disclosed in the aforementioned Druz application, a conversion device such as a transposition mechanism is preferably used at the transmitter and at each receiver. This mechanism transposes the control signal representing such information and derived at the receivers by demodulating its carrier during each of the mode-determining intervals and the transposition produces a second control signal, the later representing a code pattern determined conjointly by the patern of the first control signal and by the transposition mechanism. It is this second control signal that is applied to the actuating mechanisms of the coded at the transmitter and of the decoder at any receiver. Since the aforesaid first control signal, radiated to receivers as a modulation component of a suitable carrier, represents only partial information concerning the coding schedule of the television signal, its use in unauthorized receivers not equipped with an appropriate transposition mechanism does not provide sufficient information to accomplish decoding of the coded television signal.

For the operation under consideration, the conversion or transposition mechanism of the transmitter and receivers is usually adjustable so that the specific transposition effected of the first control signal and the code pattern of the second control signal resulting from that transposition may be altered from time to time. In practice, the setting of the transposition mechanism at the transmitter is altered at appropriate intervals, which may conveniently be at the end of each subscription program. In order that a given subscriber may utilize the coded television signal of a subsequent program interval he must be apprised of the specific setting of the transposition mechanism applicable to that particular program. This latter information may be obtained verbally from a distribution center or by any other suitable means. With the described arrangement, the coding schedule of the subscription television system is extremely flexible; it may be altered at frequent intervals merely by adjusting the transpositon mechanism at the transmitter. Moreover, thes ystem lends itself well to the equitable and convenient assessment of subscription fees. The service charge is made on the basis of programs actually requested by the subscriber.

It is, accordingly, an object of the present invention to provide an improved subscription television system in which coding of the television signal is effected with a high degree of complexity and in accordance with an extremely flexible coding schedule, and in which charges may be assessed against subscribers on a fair and equitable basis.

A further object of the invention is to provide improved encoding apparatus for use in a subscription television system.

A still further object of the invention is to provide such improved apparatus which enables certain coding information to be transmitted directly to subscriber receivers without the need for a line circuit or other closed channel.

Yet another object of the invention is to provide such improved apparatus which establishes a high degree of flexibility with respect to the coding of the television signal, enabling the coding schedule to be altered at frequent intervals.

A still further object of the invention is to provide such apparatus which entails a minimum of components and circuitry and which is relatively economical to construct and simple to adjust.

In accordance with the invention in one of its aspects, a subscription television system comprises encoding apparatus for establishing the system in a plurality of different operating modes. Means are provided for deriving during each of a series of spaced mode-determining intervals a code signal which, in each such interval, has a pattern of characteristic variations representing a selected one of the operating modes and which may vary as to mode representation from one such mode-determining interval to the next. Further means are provided for examining the pattern of characteristic variations of the code signal during each of the mode-determining intervals to determine the operating mode represented thereby and for effecting actuation of the encoding apparatus in accordance with such mode representations.

According to a feature of the invention, the code signal is developed by initially providing a combination of signal components and then permuting at least some of these components.

In accordance with another aspect of the invention, the code signal is developed by employing a multiplicity of code-determining circuits along with a plurality of switches individually having a plurality of operating positions and collectively establishing different prescribed ones of a multiplicity of different interconnection patterns between the code-determining circuits in accordance with the instantaneous positions of the switches with respect to one another. The switches are individually adjustable relative to one another to permit selection of any one of the multiplicity of different interconnection patterns. A signal source provides a control signal having a random characteristic, and the code signal deriving means, which includes the switches, are coupled to this source for developing the code signal which will have a characteristic varying in accordance with a predetermined code schedule determined in part by the interconnection pattern established by the switches and in part by the random characteristics of the control signal.

Figure 2:
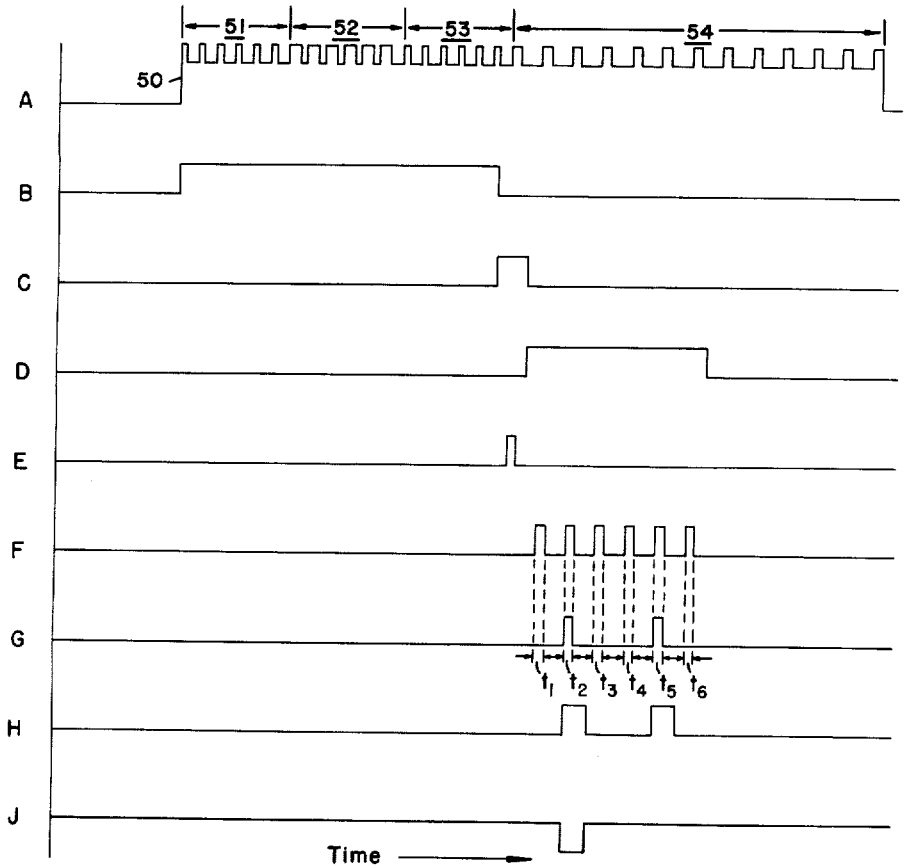
Figure 3:
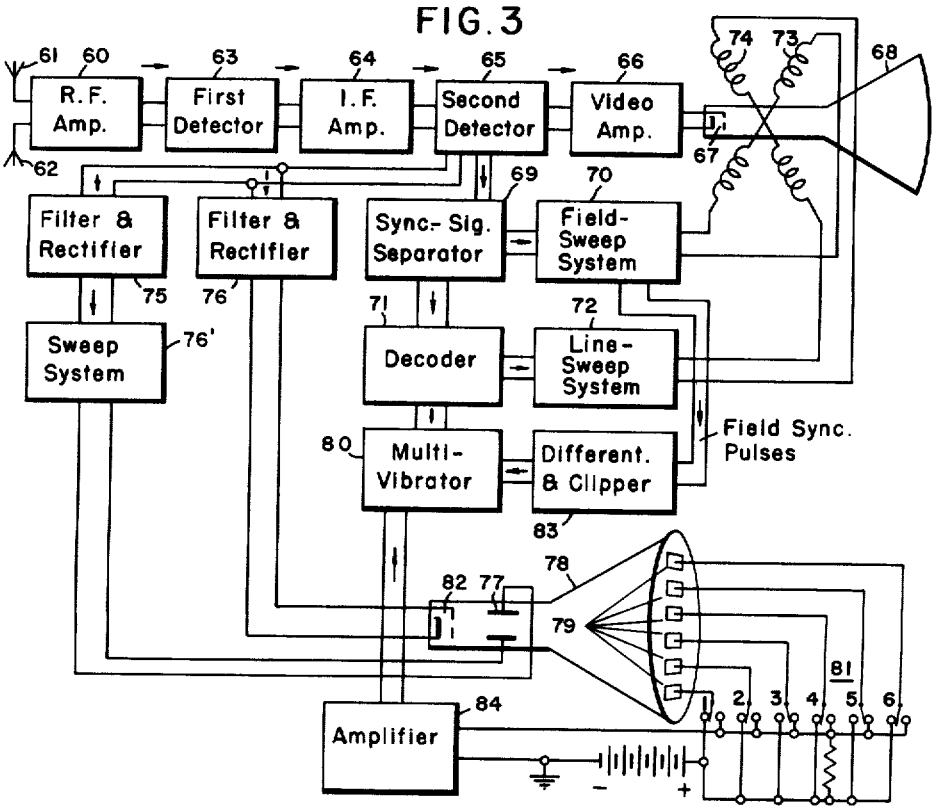
Figure 4A:
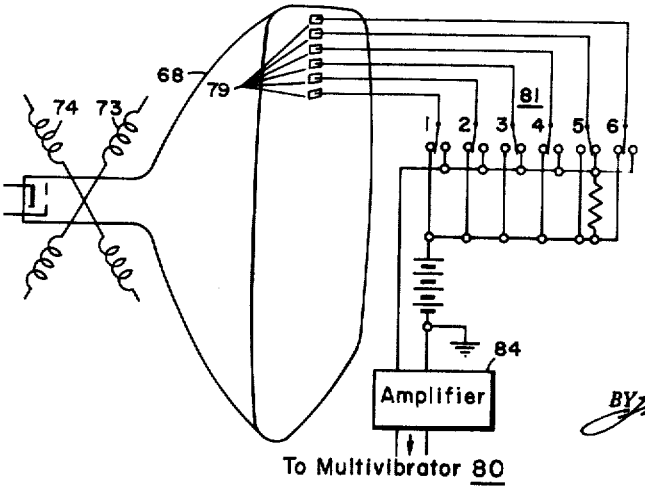
Figure 5:
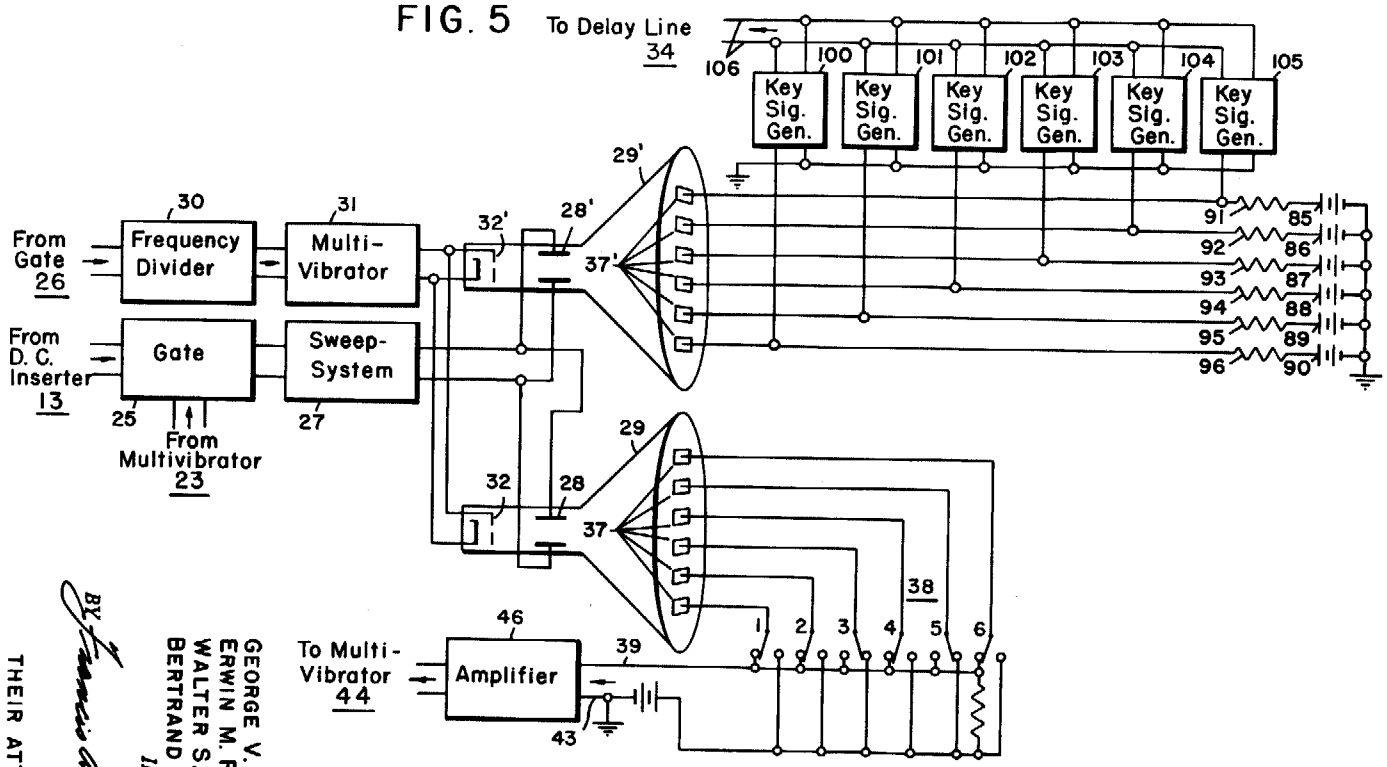
Figure 4B:
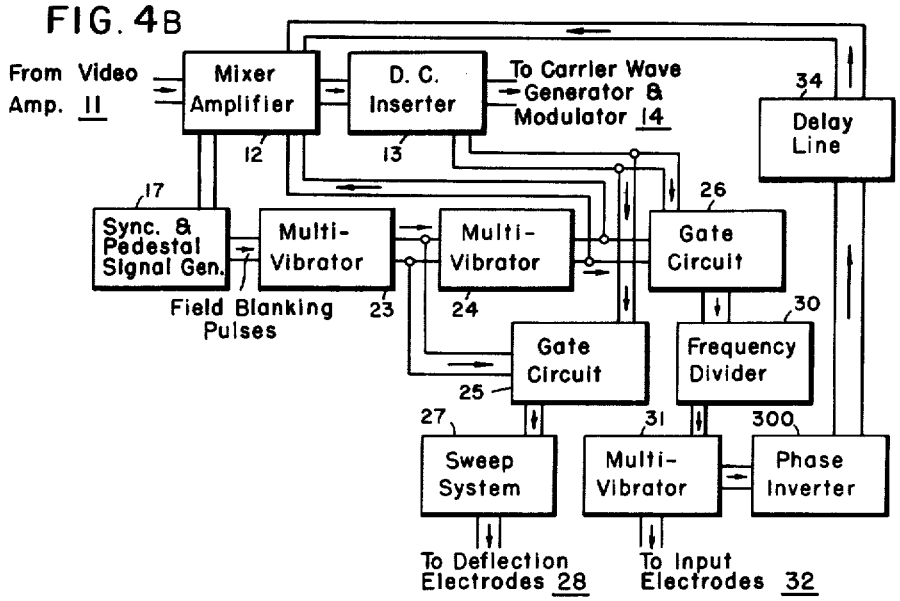
Figure 6:
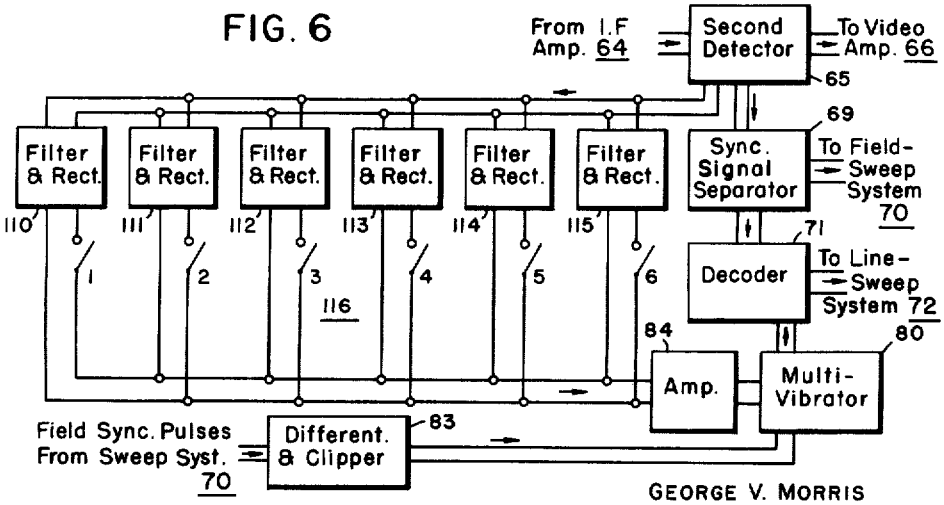
Figure 7:
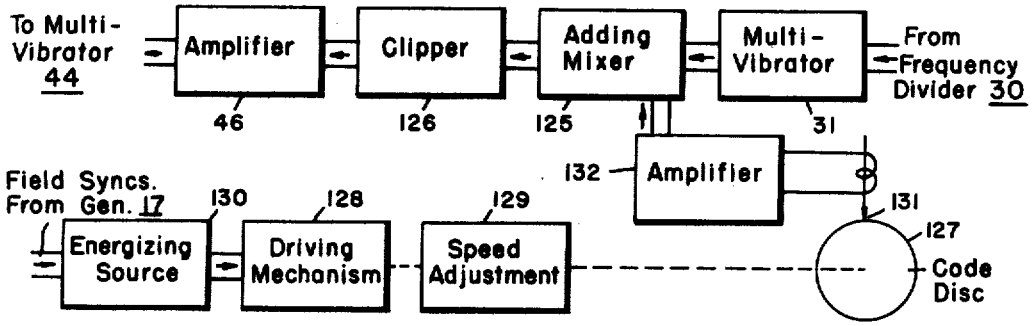
Figure 8:
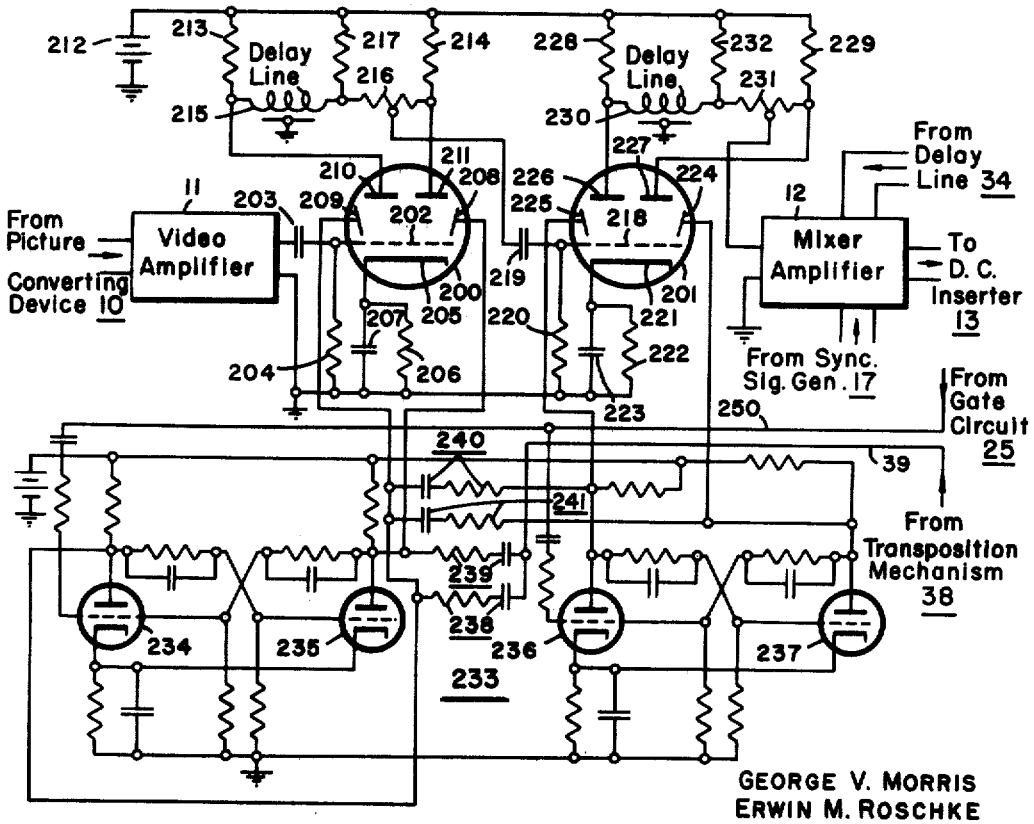

The features of this invention which are believed to be new are set forth with particularity in the appended claims. The invention itself, however, together with further objects and advantages thereof may best be understood by reference to the following description when taken in conjunction with the accompanying drawings wherein similar components are designated by similar reference numerals throughout and in which:

FIGURE 1 represents a subscription television transmitter constructed in accordance with one embodiment of the invention, FIGURE 2 comprises various curves useful in explaining the operation of the invention, FIGURE 3 represents a receiver for operation in conjunction with the transmitter of FIGURE 1, FIGURES 4A and 4B respectively show modifications of a portion of the receiver of FIGURE 3 and of the transmitter of FIGURE 1, FIGURE 5 is another modification of a portion of the transmitter of FIGURE 1, FIGURE 6 shows a subscription television receiver for operation in conjunction with the transmitter as modified by the arrangement of FIGURE 5, and FIGURES 7 and 8 are still further modifications of the invention.

The transmitter of FIGURE 1 includes a picture-converting device 10 which may be an iconoscope, image-orthicon or other well-known type having output terminals connected to a video amplifier 11 of any desired number of stages. The video amplifier is connected to a mixer amplifier 12, which in turn, is coupled through a direct-current inserter 13 to a carrier-wave generator and modulator 14. The output terminals of unit 14 are connected to an appropirate antenna circuit 15, 16. The transmitter also includes a generator 17 which produces line- and field-synchronizing pulses and associated pedestals, and supplies such components to mixer 12. Unit 17 also furnishes field-drive pulses to a field-sweep system 18, and line-drive pulses through a coder 19 to a line-sweep system 20. The output terminals of sweep systems 18 and 20 are connected, respectively, to the field-deflection elements 21 and line-deflection elements 22 associated with device 10.

In the operation of the transmitter as thus far described, picture-converting device 10 produces video components representing a scene to be televised, these components being amplified in video amplifier 11 and supplied to mixer 12 wherein they are combined with the synchronizing components and associated pedestals from unit 17 to produce a composite television signal. The television signal is appropriately adjusted as to background level in direct-current inserter 13 and supplied to unit 14 wherein it is modulated on a picture carrier for radiation from antenna 15, 16. The field scansion of device 10 is synchronized at the field-scanning frequency of the system due to the control of sweep system 18 by unit 17. The line scansion of device 10 is controlled at the line-scanning frequency of the system, but the timing of the line scansion is altered during the program interval due to the actuation of coder 19. The coder has two operating conditions, one in which the line-drive pulses are translated to sweep system 20 with no applicable timing change so that the transmitter functions in a first or normal mode and the other in which the line-drive pulses are, for example, delayed a selected amount before application to the line sweep system causing the tarnsmitter to operate in a second or abnormal mode. The coder is actuated from one operating condition to the other in a manner to be described in detail hereinafter. The variation in timing of the line-drive pulses as supplied to sweep system 20 imposes a corresponding variation in the line scansion of device 10. This, in turn, causes the time relation of the video components supplied to mixer 12 to vary with respect to the line-synchronizing components supplied to the mixer from generator 17. The television signal may, therefore, be considered effectively coded since it does not result in intelligible image reproduction in standard television receivers not equipped with appropriate decoding apparatus because such receivers depend upon an invariable time relation between these components in order to synthesize images faithfully.

Complete details of coder 19 may be found in the aforementioned Roschke patent which discloses and claims a subscription television system in which coding is effected by varying the time relation of the video components of a television signal with respect to the synchronizing components and in accordance with a coding schedule. The present invention is not limited to that particular manner of coding the television signal but, as will become apparent, may be employed in a system where the image scanning is inverted, where the polarity of the video signal is reversed or where any of a variety of other specific coding techniques are adopted.

Consideration will now be given to the encoding mechanism which imposes a selectable coding schedule on coder 19 and to the manner of disseminating coding information to subscribed receivers.

Generator 17 is connected to a multivibrator 23 which, in turn is connected to a further multivibrator 24 and to a gating circuit 25. The output terminals of multivibrator 24 are connected to another gating circuit 26 and the input terminals of gate circuits 25 and 26 are connected to direct-current inserter 13 to derive a portion of the television signal in a manner to be described. Gate circuit 25 is connected to a sweep system 27 which energizes deflection elements 28 of a commutating device 29. Device 29 is shown as a cathode-ray commutator although its mechanical equivalent may be used if so desired. Gate circuit 26 is connected to a frequency divider 30 which is of the random type disclosed and claimed in copending application Serial No. 32,457, filed June 11, 1948, and issued March 11, 1952, as Patent 2,588,413, in the name of Roschke and assigned to the present assignee. The output terminals of frequency divider 30 are connected to a multivibrator 31 which, in turn, is connected to the input electrodes 32 of electronic commutator 29. Gate circuit 25 is connected to a first key-signal generator 33 while multivibrator 31 is connected to a second key-signal generator 35 and both such generators are coupled to input terminals of a delay line 34 having output terminals connected to input terminals of mixer amplifier 12 by leads 36.

Commutator 29 includes a series of target elements or segmental anode electrodes 37 each of which may be connected either to lead 39 or to lead 40 through a corresponding series of single-pole double-throw switches 38 which comprise a conversion device in the form of a permutation mechanism and which are numbered 1–6 since the commutator has been shown with six target elements. Lead 39 is connected to lead 40 through a load resistor 41, and lead 40 is connected to the positive terminal of a source of unidirectional potential 42 having a negative terminal connected to ground and to a lead 43. Leads 39 and 43 are connected through an amplifier 46 to the input terminals of a multivibrator 44 having further input terminals connected to unit 17 through a differentiator and clipper 45 and having output terminals connected to coder 19.

The field-synchronizing component inserted into the television signal during each field-retrace interval is of standard wave form as shown in curve A of FIGURE 2 and comprises a blanking pedestal 50, a series of equalizing pulses 51, a serrated field-synchronizing pluse 52, a further series of equalizing pulses 53, and a final series of line-synchronizing pulses 54. Standard synchronizing-signal generators, such as unit 17, develop one or more gating pulses during each field-retrace interval to interrupt the normal line-synchronizing pulses 54 and insert the equalizing and serrated field pulses in the time relation shown. One such pulse is indicated in curve B and in the arrangement of this invention, is supplied to multi-vibrator 23. The trailing edge of the gating pulse triggers the multivibrator causing it to generate a pulse, shown in curve C, having a duration such as to embrace the first pulse only of the series 54 of line-synchronizing pulses. The output pulse from multibrator 23 is applied as a trigger pulse to multivibrator 24 which fires on the trailing edge thereof and generates a signal, shown in curve D, comprising a pulse component embracing an integral number N of line-synchronizing pulses following the first pulse of the series 54. "N" in the illustrated embodiment is equal to *six although* any number of line-synchronizing pulses may be selected by controlling the width or duration of the pulse of curve D.

The signal from multivibrator 23 is concurrently applied to gate circuit 25 to open the gate and translate only the first one of the series of line-synchronizing pulses 54 of the composite television signal obtained from D. C. inserter 13. The pulse thus selected is shown in curve E and is applied to sweep system 27. The sweep system, which may comprise a condenser-discharge stage of conventional design, supplies a deflection signal to electrodes 28 and initiates a sweep cycle of the cathode-ray beam in device 29 over target elements 37. Each sweep of the target elements takes place within the interval of the series of line pulses 54 and is initiated by the first pulse of the series.

The output signal from multivibrator 24 (curve D) is applied to and actuates gate circuit 26 to select the desired series of N line pulses from series 54 following the first pulse of the series, as shown in Curve F, and to supply the selected pulses to frequency divider 30. These pulses are selected during each of a multiplicity of mode-determining intervals which in this instance individually comprise a portion of the field-retrace interval. The frequency divider supplies randomly divided pulses shown in curve G to multivibrator 31. The multivibrator generates a pulse in response to each pulse of curve G and the duration of its output pulse is slightly less than the time separation of successive line pulses 54. As this multivibrator is triggered by each of the pulses (curve G) from the frequency divider, it supplies pulses shown in curve H to the input electrodes 32 of device 29 and, as each of these latter pulses is of positive polarity, they tend to increase the intensity of the beam of device 29. In usual practice, the beam is normally biased to cut-off and each applied pulse energizes the beam for the duration of that pulse. Moreover, the sweep signal applied to electrodes 28 steps the beam from one elemental target 37 to the next in time coincidence with the occurrence of the selected line pulses of curve F. In other words, the beam is incident upon the first target element during the first selected line pulse, impinges upon the second target element during the second selected line pulse and so forth. In this manner the code pattern represented in curves G and H is effectively transferred to the target elements of device 29.

The signal condition established on such target elements is subject to still another code selection in arriving at the final encoding signal employed in controlling coder 19. This further selection is determined by the conversion or permutation mechanism comprising the bank of switches 38. The bank 38 has N individual switches, corresponding to the number of pulse components (curve F) selected by gating circuit 26 and to the number of target elements 37. When any given switch rests against its left contact, as viewed in FIGURE 1, its associated target element is connected in series with a load impedance 41. Consequently, if the beam of device 29 is energized during the portion of its sweep when it impinges on that particular target element, a potential drop is developed across resistor 41 producing a pulse component across leads 39 and 43. Of course, if the beam is not energized during that part of its sweep, no pulse component appears across these leads. On the other hand, when any given switch rests against its right terminal, its associated target element is connected directly to the positive terminal of potential source 42 and load impedance 41 is not in the circuit. Hence no pulse component can be applied to leads 39 and 43 whether the beam is energizes or not as the particular target element is scanned. Therefore, the individual target elements 37 may be rendered effective or inactive merely by the settings of their associated switches.

The selective adjustment of switch 38 for any operating interval may be considered to represent a code pattern and there are as many such patterns available as there are possible combinations of switch adjustments. When the switches are conditioned to represent any selected code pattern, the actuating signal applied to amplifier 46 over leads 39, 43 represents a code pattern conjointly determined by the pulse selection effected by frequency divider 30 and by the chosen adjustment of permutation mechanism 38.

Continuing the illustrative case depicted by the curves of FIGURE 2, it will be recalled that curve G denotes the pulse selection made by frequency divider 30. For the switch setting shown, switches 1, 2, 4 and 6 rest against their left contacts including the load impedance 41 in circuit with the assigned target elements, whereas switches 3 and 5 rest against their right contacts excluding the load impedance from circuit relation with their associated target elements. The selection of pulses numbered 2 and 5 (curve G) by frequency divider 30 translates a pulse only to switch 2 through the active target elements 1, 2, 4 and 6. The remaining pulse No. 5 is translated to target element 5 which is one of the two inactive target elements, rendered inactive by the setting of switch 5. Consequently, only a single pulse, shown in curve J, is applied to amplifier 46 for the case under consideration.

The amplified pulse output from amplifier 46 is applied to an actuating system which in this instance comprises multivibrator 44. If so desired, the actuating system and coder 19 may be incorporated to form but a single unit. The multivibrator is a conventional single-trip device that may be triggered from any one stable operating condition to the other by applied pulses. At the start of each field-retrace interval, the multivibrator is actuated to its first stable condition in a manner to be described hereinafter and may be actuated to its second stable condition depending on the presence or absence of a pulse output from amplifier 46. When the amplifier supplies one or more actuating pulses to multivibrator 44, it is triggered from its first to its second operating condition by the first such pulse and is unaffected by the succeeding pulses since they are all of like polarity. Having once been actuated, the multivibrator remains in its second operating condition for the duration of the immediately succeeding field-trace interval. At the end of that trace interval, the differentiating circuit of unit 45 derives a pulse corresponding to the leading edge of the next succeeding field-blanking pedestal 50 which is applied to the multivibrator to restore it to its first stable condition. The multivibrator remains in its first operating condition until amplifier 46, repeating the pulse output obtained from commutator 29 in conjunction with frequency divider 30 and transportation mechanism 38, actuates the multivibrator to its second operating condition. The multivibrator, therefore, supplies a pulse-modulated signal to coder 19 having a pulse component initiated in any field-retrace interval in which one or more pulses are delivered by amplifier 46 and terminated at the beginning of the immediately succeeding field-retrace interval. That is multivibrator 44 responds during any mode-determining interval to the code pattern of the signal from transposition mechanism 38 for selectively actuating coder 19 to one of its operating conditions.

Coder 19 is normally maintained in a first operating condition wherein line-drive pulses are translated therethrough to line-sweep system 20 with no appreciable delay and is actuated to a second operating condition, wherein the line-drive pulses are delayed a preselected amount, by and for the duration of each aforesaid pulse component from multivibrator 44. The line-synchronizing pulses generated in unit 17 and delivered to mixer amplifier 12 have an invariable timing and, consequently the actuation of coder 19 under the control of multivibrator 44 may effect coding of the composite television signal obtained from the mixer amplifier. More specifically, the function of the coder in introducing a time delay in the horizontal or line-drive system at spaced operating intervals changes the timing of the scanning process of converter 10 and the timing of the generated video components in respect of the line-synchronizing pulses supplied to mixer amplifier 12. Therefore, the timing of the components of the radiated television signal is altered from time to time effectively to code the television signal. Since the pulse components of the signal from multivibrator 44 are initiated and terminated during field-retrace intervals, the timing alterations in the television signal also occur during such intervals which precludes any possibility of distortion that could arise should the alternations take place during trace intervals.

As previously stated, gate circuit 25 develops a pulse (curve E) which determines the initiation of each sweep cycle of commutator 29, and this pulse is concurrently applied to key-signal generator 33, causing the generator to develop a burst of key signal of a distinctive frequency in time coincidence with and for the duration of each such pulse. Moreover, the output signal of multivibrator 31 (curve H), representing the code pattern resulting from the pulse selection of frequency divider 30, is applied to second key-signal generator 35, causing it to develop bursts of key signal of a frequency distinctly different from that of generator 33, and corresponding both as to time and duration to the pulse components shown in curve H. The key-signal bursts from generators 33 and 35 are applied through delay line 34 to mixer amplifier 12 so that they may be superposed on the blanking pedestal 50 for distribution to the subscriber receivers. Delay line 34 delays the bursts slightly so that they are impressed on the blanking pedestal in the spaces between line-synchronzing pulses 54.

For convenience of explanation, the description has proceeded thus far on the basis of a given set of operating conditions wherein frequency divider 30 makes that pulse selection represented in curve G. It has been further demonstrated that this pulse selection, for the adjustment of permutation mechanism 38 assigned to the particular program interval, causes an actuating pulse (curve J) to be applied through amplifier 46 to multivibrator 44 during the mode-determining interval that has been discussed. Since the frequency divider has a random division rate, during other mode-determining intervals the pulse selection will be specifically different from that indicated in curve G and may, for example, include only the third and fifth pulses from the signal of curve F. When either or both of these pulses is selected to the exclusion of the remaining pulses of curve F, there are no pulses applied to amplifier 46 in view of the adjustment of permutation mechanism 38 so that for the mode interval following any such mode-determination multivibrator 44 is not able to actuate coder 19 which remains in its normal or first operating condition and establishes the normal or first operating mode for the transmitter. Accordingly, the random pulse selection made by frequency divider 30 in conjunction with the further selection effected by mechanism 38 causes multivibrator 44 to actuate coder 19 in a random fashion and varies the transmission in similar fashion as between its two modes. This random characteristic is especially desirable in commercial applications of subscription television because it is exceedingly difficult for unauthorized receivers to decode the subscription telecast.

In general, gate circuit 26 supplies to frequency divider 30 a signal (curve F) having a series of N pulse components repeating during each mode-determining interval, and the frequency divider in turn supplies a signal (curve G) to multivibrator 31 likewise having N pulse components individually representing one of two alternate coding conditions. This concept of the code components represented by curve G may be made more clear by reference to the construction lines of FIGURE 2 wherein it is seen, for the assumed case, that there are six intervals $t_1$–$t_6$ each of which is devoted to one code component. In each of the intervals $t_1$, $t_3$, $t_4$ and $t_6$ there is a code condition that is analogous to the spacing indicia in a code combination of marks and spaces, whereas during each of the remaining intervals $t_2$ and $t_5$ there is the alternate code condition, namely, a mark. Therefore, curve G may be considered to represent a code pattern of six components in a combination of marks and spaces, individually representing one of two coding conditions and collectively representing a particular code pattern. The specific combination of marking and spacing components is a manifestation of the division or pulse selection effected by frequency divider 30 which may vary from one mode-determining interval to another due to the random nature of the frequency divider.

The key signal distributed to subscriber receivers as a modulation of the video carrier represents the control signal applied to commutator 29, but since the actuating signal applied to multivibrator 44 is determined conjointly by the code pattern of that control signal and the chosen condition of mechanism 38, the distributed key signal is different from the actuating signal determining the coding of the television signal, and therefore, does not of itself convey sufficient information for decoding the television signal. For this reason, the key signal need not be disseminated to subscriber receivers over a private link but may be distributed in the described manner as a modulation component of the television signal. It is also evident that the coding schedule employed at the transmitter may be changed from time to time merely by establishing the switches of permutation mechanism 38 to represent other selected code patterns.

The various components of the transmitter of FIGURE 1 are in themselves well-known to the art or have been described in detail in the aforementioned Roschke Patent 2,547,598. Since these elements in themselves form no part of the present invention, a detailed description thereof is deemed to be unnecessary herein. Of course, the transmitter will include conventional audio stages but they have been omitted purely for purposes of simplification.

The receiver of FIGURE 3 which is constructed to utilize the coded transmission comprises a radio-frequency amplifier 60 of one or more stages having input terminals connected to an antenna 61, 62 and output terminals connected to a first detector 63. The first detector is coupled through an intermediate-frequency amplifier 64 of any desired number of stages to a second detector 65 which, in turn, is coupled through a video amplifier 66 to the input electrodes 67 of a cathode-ray image-reproducing device 68. Second detector 65 is also connected to a synchronizing-signal spearator 69, which in turn is coupled to a field-sweep system 70 and through a decoder 71 to a line-sweep system 72. The output terminals of sweep systems 70 and 72 are connected to the field-deflection elements 73 and line-deflection elements 74 associated with reproducing device 68.

When the receiver of FIGURE 3 is tuned to accept the coded subscription telecast from the transmitter of FIGURE 1, that signal is intercepted by antenna 61, 62 and amplified in radio-frequency amplifier 60. The amplified signal is heterodyned to the selected intermediate frequency of the receiver in first detector 63 and the resulting intermediate-frequency signal is amplified in amplifier 64 and detected in second detector 65 to produce a composite video signal. The video signal is amplified in amplifier 66 and applied to electrodes 67 to control the intensity of the cathode-ray beam in device 68 in accordance with the image intelligence.

The synchronizing components are separated from the video signal in synchronizing-signal separator 69, the field-synchronizing pulses being supplied to field-sweep system 70 and the line-synchronizing pulses to line-sweep system 72 through decoder 71. In this manner, the field scansion of device 68 is synchronized at the field synchronizing frequency of the system and the line scansion is synchronized at the line-synchronizing frequency. In order to compensate for the aforedescribed timing variations between the video and line-synchronizing components of the television signal which otherwise preclude intelligent image reproduction of the telecast, decoder 71 is actuated in time coincidence with the actuation of coder 19 at the transmitter to introduce a compensating variation in the timing of the line scansion of device 68. When this compensation is effected, device 68 is able to reproduce the picture intelligence. The arrangement for accomplishing the compensation will now be described.

Second detector 65 is connected to a first filter and rectifier 75, and to a second filter and rectifier 76. Unit 75 is connected to a sweep system 76' which, in turn, is coupled to the deflection elements 77 of a cathode-ray type commutator 78. The commutator may be similar to device 29 at the transmitter and includes a corresponding series of target elements 79 connected in like manner to a multivibrator 80 through a conversion device in the form of a permutation mechanism 81 and through an amplifier 84. Filter and rectifier 76 on the other hand is connected to the input electrodes 82 of cathode-ray commutator 78. In order that no two receivers in a selected group will have the same switching sequence for a particular setting, the connections from targets 79 to the individual switches of permutation mechanism 81 can be different for each receiver. In that way, differently numbered switches are actuated in each receiver to achieve a particular setting and the information obtained from the distribution center by any particular subscriber pertains to his receiver only or to widely separated receivers in different groups.

Filter 75 selects each key-signal burst of the received signal which represents the timing pulse of curve 2E and, after rectification thereof, supplies to sweep system 76' in each mode-determining interval a like timing pulse to control the sweep of device 78 in synchronism with the sweep of device 29 at the transmitter. Filter 76 selects these key-signal bursts occurring in each mode-determining interval of the received signal which correspond to the pulses of curve 2G and, after rectification thereof, supplies similar pulses to input electrodes 82 of commutator 78. Hence the beam of device 78 is modulated in accordance with pulses corresponding to those applied to electrodes 32 of device 29 at the transmitter. Multivibrator 80 is connected to field-sweep system 70 through a differentiator and clipper 83 to derive a restoring pulse from the leading edge of each field-synchronizing pulse to return the multivibrator to its first or initial operating condition at the start of each field retrace in a manner similar to the actuation of multivibrator 44 at the transmitter.

Whenever a subscriber wishes to receive a particular subscription program, he calls the distribution center and obtains the necessary information individual to his receiver to adjust the mechanism 81 to correspond with the setting used at the transmitter for coding that program. When mechanism 81 is properly adjusted, the pulses supplied to multivibrator 80 through amplifier 84 correspond to those supplied to multivibrator 44 at the transmitter so that the actuation of decoder 71 occurs in approximate time coincidence with the actuation of coder 19 at the transmitter. It is to be noted that delay line 34 at the transmitter causes the various key-signal bursts received as modulation components of the television signal to be delayed slightly with respect to their corresponding pulse components at the transmitter. This causes the actuation of decoder 71 to take place a short time after the actuation of coder 19 at the transmitter but that does not affect the synchronous operation of the system since the changes in mode of transmission occur during field-retrace intervals and it is immaterial where in the retrace intervals the change actually takes place.

The target electrodes of commutators 29 or 78 may be replaced by a masked fluorescent screen, the mask having apertures corresponding in position to the target elements 37 or 79. Alternatively, the target electrodes may be replaced by fluorescent patches. With any such arrangement, a series of photo-cells having individual shutters in their optical paths to the screen are used instead of the switches of permutation mechanisms 38 or 81. The shutters may be adjusted to any desired combination so that only selected ones of the photo-cells respond to the energization of the various apertured portion of the fluorescent screen by the cathode-ray beam. The shutters and photo-cells then constitute a conversion mechanism and the actuating signal applied to multivibrator 44 through amplifier 46 is determined by the setting of the shutters, that is, the adjustment of the conversion device.

In the arrangement of FIGURE 4A the receiver reproducing tube 68 itself performs the functions of the commutator device 78 in the embodiment of FIGURE 3. In this arrangement, target elements 79 are disposed in the top portion of the image screen of tube 68 in positions corresponding to the initial line-traces of each field and are connected to mechanism 81 in the manner of FIGURE 3. The mode-determining intervals now occur during the commencement of each field-trace interval instead of during field-retrace intervals. Correspondingly, the pulse selection at the transmitter is from the line-synchronizing pulses following the termination of each field-retrace interval instead of from the series of pulses 54 of the field retrace. This may be achieved with the arrangement shown in FIGURE 4B which is generally similar to a portion of the transmitter of FIGURE 1. However, multivibrator 23 is now triggered by the trailing edge of each field-blanking pulse and the duration of its output pulse is adjusted to embrace the first line-synchronizing pulse succeeding field retrace. This pulse opens gate 25 which, for the embodiment under consideration, may be amplitude selective in the nature of synchronizing-signal separator to supply the desired line-synchronizing pulses to sweep system 27 to the exclusion of video components.

Multivibrator 24 is coupled to mixer 12 and in addition to the functions accomplished thereby in the embodiment of FIGURE 1, it here further serves to supply a blanking pulse to the mixer, suppressing the video content from so much of the field-trace interval as is devoted to the distribution of key-signal information. In the case under consideration this amounts essentially to N+1 lines at the start of the field trace. The actuation of gate 26 under the control of multivibrator 24 and the selection of pulses by random divider 30 are the same as described in connection with FIGURE 1. However, the pulses from multivibrator 31 are here supplied to delay line 34 through a phase inverter 300 to be added into the composite video signal mixer 12 as white-level components occurring within line-trace periods to avoid disturbing the normal line-synchronizing pulses. The white level or inward modulation by which the pulse selection made by divider 30 is conveyed to subscriber receivers causes the beam to be energized as it is incident upon selective ones of the target elements 79 of the combined picture tube and commutator represented in FIGURE 4A. The use of a portion of the picture tube in the transposition of key signal information, in the manner described above, is feasible because the fractional part of the field trace devoted to this purpose is so small (6 to 15 lines out of approximately 525) that the reproduced image is not affected for all practical purposes.

FIGURE 5 shows a modification of a further portion of the transmitter of FIGURE 1 wherein each pulse of the series of pulses, constituting the control signal of curve 2H derived from multivibrator 31, is indicated by a corresponding burst of a key signal having a frequency distinctive to and therefore indicative of a particular pulse of the series. The key-signal bursts are distributed to subscriber receivers as modulation components of the television signal. While any of a variety of mechanisms may be employed for this purpose, the arrangement illustrated comprises a second commutator 29' having input electrodes 32' connected to multivibrator 31 and scanning elements 28' connected to sweep system 27. The commutator also has a series of target elements 37' connected respectively to the positive terminals of unidirectional potential sources 85–90 through load resistors 91–96, the negative terminals of such sources being connected to ground. Target elements 37' are further connected to respective key-signal generators 100–105 having output terminals, in turn, connected by line 106 to delay line 34, coupled to mixer 12 as in the embodiment of FIGURE 1. The cathode-ray beam of commutator 29' is scanned across target elements 37' in time coincidence with the scansion of similar elements 37 of commutator 29. Whenever a pulse component is translated by any one of target elements 37', a potential drop is developed across the corresponding one of load resistors 91–96, and the associated key-signal generator is energized to develop a burst of key signal of distinctive frequency.

When the subscription transmitter is modified to employ a plurality of different carriers to convey the code information of curve H of FIGURE 2, as by utilizing the arrangement of FIGURE 5, the overall encoding and actuating mechanism of the receiver of FIGURE 3 is to be modified as indicated in FIGURE 6 and to auxiliary multiple anode scanning tube is required. A plurality of filter-rectifier units 110–115 are coupled to an output circuit of second detector 65 and each such unit is selective to a single, assigned one of the carrier signals conveying the coding information. The conversion mechanism 116 in this case includes single-pole single-throw switches 1–6 connected directly in the output circuits of units 110–115 as shown and this mechanism again makes a pulse selection and delivers a final control signal through amplifier 84 to multivibrator 80 as in the operation of the receiver of FIGURE 3.

In the embodiments of the invention thus far described, the conversion mechanism operating on the control signal of curve 2H, which represents the pulse selection effected by random divider 30, merely passes along or rejects any component of the control signal as determined by the selected operating conditions of its several single-pole, single-throw switches 1–6 inclusive. In general, the function of the conversion mechanism is to accomplish a second pulse selection to the end that the final control signal supplied to multivibrator 44 may represent a specifically different code combination from that radiated or otherwise distributed to subscriber receivers. Similar results may be obtained with other forms of conversion mechanisms which, in effect, operate upon the control signal of curve 2H with another signal representing a code combination of marking and spacing components. Such a conversion mechanism, suitable for inclusion in the transmitter or in subscriber receivers, is represented in FIGURE 7. In this modification the final control signal is obtained by adding to the control signal of curve 2H, that is, the output signal of multivibrator 31, a further control signal representing a code combination of marking and spacing components and developed within the conversion mechanism. More specifically, the output circuit of multivibrator 31 is coupled to a mixer amplifier 125 which also receives a control signal recorded on a rotatable code disc 127. The latter signal is constituted by a code combination of marking and spacing indicia recorded on the periphery of disc 127, each marking indicia being a magnetically recorded burst of energy and each spacing indicia being the absence of any such recorded energy. The occurence of the marking and spacing indicia about the disc determines the code combination represented by the latter control signal. The disc is rotated by a driving mechanism 128, energized from a source 130 which is synchronized at the field frequency of the system by field-synchronizing pulses from generator 17. Preferably, a conventional speed adjustment 129 is interposed between the disc and its driver to attain a speed relation to be described presently. A pick-up head 131 reads the code combination recorded on the disc and delivers a corresponding control signal to mixer 125 through an amplifier 132. The output signal from mixer 125 is supplied to amplifier 46, and thence to multivibrator 44, through an amplitude-selective device or clipper 126 having a threshold level such that pulse components from source 31 or source 127—131, considered alone, are not translated thereby. However, a marking pulse from one source added to a coincident marking pulse from the other source exeeds the theshold level and reaches multivibrator 44.

If this mechanism is incorporated into the transmitter in place of units 37 and 38 an identical arrangement should replace units 78 and 81 in subscriber receivers, and any known phasing technique may be adopted to maintain the discs 127 of the transmitter and receivers in phase as well as in synchronism. It is apparent that the size of the disc 127 may be chosen so that the signal obtained by scanning the disc in one mode-determining interval need not be the same for each such interval. In achieving that result it is desirable that the disc diameter be such that the time of duration of the mode-determining interval be different from the time required for one revolution of the disc, and neither time an integral multiple of the other. Alternatively, the disc may be large enough that its time of revolution encompasses a plurality of mode-determining intervals so that the disc may be considered as bearing a succession or series of code combinations which, preferably, are specifically different from one another.

In the embodiments thus far described, the multicomponent control signal is shown as utilized to actuate the encoding apparatus of the transmitter and the various receivers between two different modes. The transmitter of FIGURE 8, however, may be operated in more than two modes to complicate further the coding of the television signal. In the previous embodiments the control signal from conversion mechanism 38 was used to trigger multivibrator 44, the multivibrator remaining in a first operating condition during any mode-determining interval in which the control signal had no pulse components, and being triggered to a second operating condition during any mode determining-interval in which the control signal had one or more pulse components. In the embodiment of FIGURE 8, the actuating system for the coder responds to the actuating signal from mechanism 38 and operates the coding apparatus into a selected one of a plurality of operating modes during each mode-determining interval as determined by the number of pulse components of the actuating signal during such interval.

Coding of the television signal in the instant arrangement is achieved by the selective introduction of delay lines into the video channel of the transmitter, in a manner to be described, instead of varying the timing of the line-drive pulses applied to sweep system 20. Such a coding technique is described and claimed in copending application Serial No. 243,039, entitled "Subscription Television System," filed August 22, 1951, issued August 7, 1956, as Patent 2,758,153, in the name of Robert Adler, and assigned to the present assignee. When any delay line is functionally included in the video channel, the video components of the televion signal are delayed relative to the synchronizing components originating in unit 17 effectively to code the television signal. It will be understood that in this case the line sweep system of the transmitter is directly connected to generator 17, coder 19 being omitted since a coding device is included in the video channel.

The coding arrangement of FIGURE 8 includes a pair of beam tubes 200 and 201 connected between video amplifier 11 and mixer amplifier 12 at the transmitter. In particular, one of the output terminals of video amplifier 11 is connected to the control electrode 202 of tube 200 through a coupling capacitor 203, the control electrode being connected to ground through a grid leak resistor 204 and the other output terminal of the video amplifier also being connected to ground. The cathode 205 of tube 200 is connected to ground through a cathode resistor 206 which is shunted by a capacitor 207. Tube 200 has a pair of deflecting elements 208 and 209 and a pair of target electrodes 210 and 211. Electrode 210 is connected to the positive terminal of a source of unidirectional potential 212 through a load resistor 213, whereas target electrode 211 is connected to the positive terminal of this source through a load resistor 214, the negative terminal of source 212 being connected to ground. Target electrode 210 is also connected to electrode 211 through a delay line 215 and a series resistor 216, the junction of these elements being connected to the positive terminal of source 212 through a resistor 217. The center tap of resistor 216 is connected to the control electrode 218 of beam tube 201 through a capacitor 219, the control electrode being connected to ground through a grid-leak resistor 220. The cathode 221 of the tube 201 is connected to ground through a cathode resistor 222 shunted by a capacitor 223. Tube 201 has a pair of deflection elements 224 and 225 and a pair of target electrodes 226 and 227. Electrode 226 is connected to the positive terminal of source 212 through a load resistor 228, and target electrode 227 is connected to the same terminal through a load resistor 229. Electrode 226 is also connected to electrode 227 through a delay line 230 and a series resistor 231, and the junction of these elements is connected to the positive terminal of source 212 through a resistor 232. The center tap of resistor 231 is connected to the input circuit of mixer amplifier 12.

The video signal developed at the output terminals of amplifier 11 is applied to control electrode 202 of beam tube 200 and modulates the electron beam developed therein. The video-modulated electron beam is directed either to target 210 or to target 211 under the control of deflection elements 208, 209 which may receive a deflection signal in a manner to be described. During intervals when the beam is directed to target 210, the video signal is impressed on control electrode 218 of tube 201 through a path including delay line 215 and is delayed a selected amount due to the inclusion of the delay line in the circuit. However, when the beam is directed to target 211, the video signal is applied to control electrode 218 with no appreciable delay since delay line 215 is no longer functionally included in the circuit. Likewise, the video-modulated electron beam in tube 201 is directed to target 226 or to target 227 by deflection elements 224 and 225 which may receive a deflection signal in a manner to be described. When the electron beam is directed to target 226, the video signal is supplied to mixer 12 over a path which includes delay line 230 and is delayed a selected amount due to the delay line, but when the beam is directed to target 227 delay line 230 is removed from the circuit and no appreciable delay is imparted to the video signal in its translation through tube 201 to mixer amplifier 12.

In any interval in which the electron beams in tubes 200 and 201 are directed respectively to targets 211 and 227, the video signal from amplifier 11 is supplied to mixer 12 with no appreciable time delay relative to the synchronizing components supplied to the mixer from generator 17, and the transmitter may be considered to be operating in a first or normal mode. When the electron beam in the tube 200 is directed to target 210 and the beam in tube 201 is directed to target 227, delay line 215 is functionally inserted into the circuit, and the video signal is delayed relative to the synchronizing components as determined by this delay line; the transmitter may be said to be operating in mode 2. When the beam in tube 200 is directed to target 210 and the beam in ube 201 is directed to target 226, both delay lines 215 and 230 are effective and the delay of the video signal s as determined by the total delay of the two lines. This may be considered as operating mode 3 of the transmitter. Finally, when the beam in tube 200 is directed to target 211 and the beam in tube 201 is directed to target 226 only delay line 230 is effective. Assuming the delay of line 215 to be different from that of line 230, the transmitter may be considered as operating in mode 4. Therefore, by the selective application of deflection signals to deflecting elements 208, 209 and to elements 224, 225 the operation of the transmitter may be selected as between four modes, and the variation of these deflection signals from one mode-determining interval to the other provides a highly complex coding schedule for the transmitted television signal.

The deflection of the electron beams in tubes 200 and 201 is controlled by a binary counter 233 of well-known design. The counter comprises two stages which, in turn, include two pairs of cross coupled electron-discharge devices 234, 235 and devices 236, 237. The control electrodes of devices 234 and 236 are connected over a lead 250 to one of the output terminals of gate circuit 25 of FIGURE 1 to derive the timing pulse of curve 2E therefrom at the start of each mode-determining interval for resetting purposes. The anodes of devices 234 and 235 are connected respectively to deflecting elements 209 and 208 of tube 200, whereas the anodes of devices 236 and 237 are connected respectively to deflecting elements 225 and 224 of tube 201. The anodes of tubes 234 and 235 are also respectively coupled through differentiating networks 238, 239 to lead 39 from the permutation mechanism 238, and the anodes of devices 236 and 237 are individually coupled to the anode of device 234 through differentiating networks 240, 241.

At the beginning of each mode-determining interval, gate circuit 25 translates a positive timing pulse shown in curve 2E, to the control electrodes of devices 234 and 236 to reset the binary in a condition wherein device 234 is conductive and 235 non-conductive and device 236 is conductive and 237 non-conductive. During this condition, the potential of deflecting element 208 is positive with respect to the potential of deflecting element 209, and the electron beam in tube 200 is directed to target electrode 211. Similarly, the potential of deflecting element 224 is positive with respect to the potential of deflecting element 225 and the electron beam in tube 201 is directed to target 227. The transmitter is now conditioned to operation in mode one.

As previously described in connection with FIGURE 1, random divider 30 and permutation mechanism 38 conjointly develop an actuating signal during each mode-determining interval. This actuating signal which appears on lead 39 may have no pulse components or it may have one or more pulse components. Assume that during a particular mode-determining interval, the actuating signal has no such pulse components. Under this condition, the binary 233 remains in its reset condition and the transmitter operates in mode one for the ensuing mode interval. However, during a succeeding mode-determining interval, the actuating signal may have one pulse component of negative polarity which triggers the circuit of devices 234 and 235 so that device 234 becomes non-conductive and device 235 becomes conductive. The circuit of devices 236 and 237 is not affected since it is necessary for device 234 to proceed from a non-conductive to a conductive state to produce a pulse of proper polarity to actuate that circuit. Therefore, deflecting element 209 is now positive with respect to deflecting element 208 and the beam of tube 200 is directed to target 210, whereas the beam of tube 201 remains directed to target 227 and the transmitter operates in the second mode for the ensuing interval.

Should the actuating signal have two pulse components during a succeeding mode-determining interval, the circuit of devices 234 and 235 is triggered twice so that in its final condition device 234 is conductive and device 235 non-conductive. As device 234 passes from a non-conductive to a conductive condition, it produces a pulse which triggers the circuit of devices 236 and 237 so that device 236 is non-conductive and device 237 is conductive. Under this latter condition deflecting element 208 is positive with respect to element 209 and the electron beam of tube 200 is directed to target 211, while deflecting element 225 is positive with respect to element 224 so that the beam of tube 221 is directed to target 226. The transmitter now is in its fourth mode. Finally, if during a succeeding mode-determining interval, the actuating signal includes three pulse components, the circuit of devices 234 and 235 is triggered three times so that device 234 is non-conductive and device 235 is conductive, whereas the circuit of devices 236 and 237 is triggered only once so that device 236 is non-conductive and device 237 is conductive. Under this condition, deflecting element 209 is positive with respect to element 208 and the electron beam is directed to target 210, whereas the beam in tube 201 is directed to target 226 and the transmitter is in its third operating mode. If the actuating signal from permutation mechanism 38 includes four or more components, the above described cycle of operations repeats. That is, for four components the transmitter again operates in mode 1; for five components it operates in mode 2, and so on.

The transmitter, therefore, may be selectively actuated into any one of its four operating modes during any mode-determining interval depending upon the number of pulse components in the actuating signal derived from permutation mechanism 38 during the particular interval. The construction and operation of binary counter 233 is extremely well-known to the art and a detailed description thereof is believed to be unnecessary.

The invention provides, therefore, an improved subscription television system in which the encoding apparatus at the transmitter and at the various receivers is actuated during spaced mode-determining intervals. The encoding apparatus is under the control of an actuating system which responds during each of the mode-determining intervals to an actuating signal, and controls the operating condition of the encoding apparatus in accordance with the code pattern represented by the actuating signal during each mode-determining interval. The actuating signal developed at the transmitter may be distributed to the subscriber receivers over a line circuit so that coincident actuation of the encoding apparatus at such receivers with the encoding apparatus at the transmitter may be maintained. Moreover, the actuating signal at the transmitter may be derived from a conversion mechanism which operates upon a derived control signal so that the actuating signal represents a code pattern determined conjointly by the control signal and by the conversion mechanism. In the latter arrangement, the control signal, since it bears only a portion of the coding information, may be distributed to the subscriber receivers as a modulation component of a radiated signal, and is used at such receivers in conjunction with similar conversion mechanisms to derive appropriate actuating signals.

Certain features described in the present application are disclosed and claimed in one or more of the following copending applications: Serial No. 35,698, filed June 28, 1948 and issued October 20, 1953, as Patent 2,656,405, in the name of Erwin M. Roschke et al.; Serial No. 36,778, filed July 2, 1948, and issued October 20, 1953, as Patent 2, 656,406, in the name of Richard O. Gray et al.; Serial No. 94,643, filed May 21, 1949, and issued October 20, 1953, as Patent 2,656,408, in the name of Richard O. Gray et al.; Serial No. 138,232, filed January 12, 1950, and issued October 20, 1953, as Patent 2,656,409 in the name of George V. Morris et al.; and Serial No. 245,178, filed September 5, 1951, and issued October 20, 1953, as Patent 2,656,411 in the name of George V. Morris et al.; all of which are assigned to the present assignee.

Features described in the present application are also disclosed and claimed in copending application Serial No. 700,854, filed December 5, 1957, in the name of Myron G. Pawley et al., constituting a divisional application of copending application Serial No. 230,618, filed June 8, 1951, and issued December 10, 1957, as Patent 2,816,156; and copending application Serial No. 700,855, filed December 5, 1957, in the name of Jacob M. Sacks constituting a continuation of copending application Serial No. 259,169, filed November 30, 1951, all of which are assigned to the present assignee.

While particular embodiments of the invention have been shown and described modifications may be made and it is intended in the appended claims to cover all such modifications as may fall within the true spirit and scope of the invention.

We claim:

1. An encoding arrangement for a subscription television system comprising: encoding apparatus having a plurality of operating conditions for establishing a corresponding plurality of operating modes in said television system and responsive during any mode-determining interval to the code pattern of an applied signal for selective actuation to one of its aforesaid operating conditions; means for deriving during a mode-determining interval a first control signal including a series of N components which individually and selectively represent one of at least two coding conditions and which collectively represent a first code patterns; a signal source for developing a second control signal including a series of componets individually and selectivly representing one of said two coding conditions; a conversion mechanism for receiving said first control signal and for utilizing said second control signal selectively to tranpose the representation of any component of said first control signal as between said coding conditions to derive a third control signal representing a code pattern determined conjointly by said first and second control signals; and means for applying said third control signal to said encoding apparatus.

2. An encoding arrangement for a subscription television system comprising: encoding apparatus having a plurality of operating conditions for establishing a corresponding plurality of operating modes in said television system; an actuating system coupled to said encoding apparatus and responsive during any mode-determining interval to the code pattern of an applied signal for selectively actuating said encoding apparatus to one of its aforesaid operating conditions; a signal source for providing a signal having a random characteristic; means coupled to said source for deriving during each of a multiplicity of spaced mode-determining intervals a control signal including a series of code signal components collectively representing a code pattern determined at least in part by said random characteristic, and means for applying said control signal to said actuating system to effect actuation thereof to establish said encoding apparatus throughout respective spaced intervals intervening said mode-determining intervals in one of its aforesaid operating conditions as determined by the code pattern of the control signal during a preceding mode-determining interval.

3. An encoding arrangement for a subscription television system comprising: encoding apparatus having a plurality of operating conditions for establishing a corresponding plurality of operating modes in said television system and responsive during any mode-determining interval to the code pattern of an applied signal for selective actuation to one of its aforesaid operating conditions; a signal source for providing a signal having a random characteristic means coupled to said source for deriving during each of a multiplicity of spaced mode-determining intervals a first control signal including a series of code signal components collectively representing a first code pattern determined at least in part by said random characteristic; a conversion mechanism coupled to said last-mentioned means for deriving in response to said first control signal a second control signal representing a code pattern determined conjointly by said first code pattern and by said conversion mechanism; and means for applying said second control signal to said encoding apparatus to establish said apparatus throughout respective spaced intervals intervening said mode-determining intervals in one of its aforesaid operating conditions as determined by the code pattern of said second control signal during a preceding mode-determining interval.

4. An encoding arrangement for a subscription television system comprising: encoding apparatus having two operating conditions for establishing first and second operating modes respectively in said television system and responsive during any mode-determining interval to the code pattern of an appiled signal for actuation to one of its aforesaid operating conditions; means for deriving during each of a multiplicity of spaced mode-determining intervals a series of N pulse components; means for effecting a random frequency division of said pulse components to derive from each of said series a first control signal including a series of N components which individually and selectively represent one of two coding conditions and which collectively represent a first code pattern; a conversion mechanism coupled to said last-mentioned means having a plurality of selectable operating conditions for deriving in response to said first control signal a second control signal representing a code pattern determined conjointly by said first code pattern and by the selected operating condition of said conversion mechanism; and means for applying said second control signal to said encoding apparatus to establish said apparatus throughout respective spaced intervals intervening said mode-determining intervals in one of its aforesaid operating conditions as determined by the code pattern of said second control signal during a preceding mode-determining interval.

5. An encoding arrangement for a subscription television system comprising: encoding apparatus having a plurality of operating conditions for establishing a corresponding plurality of operating modes in said television system; an actuating system coupled to said encoding apparatus and responsive during any mode-determining interval to the code pattern of an applied signal for selectively actuating said encoding apparatus to one of its aforesaid operating conditions; means for deriving and for applying to said actuating system at the start of each of a multiplicity of spaced mode-determining intervals a reference signal for establishing said actuating system in a reference operating condition; a signal source for providing a signal having a random characteristic means coupled to said source for deriving during each of said mode-determining intervals a control signal including a series of code signal components collectively representing a code pattern determined at least in part by said random characteristic; and means for applying said control signal to said actuating system to effect actuation thereof to establish said encoding apparatus throughout respective spaced intervals intervening said mode-determining intervals in one of its aforesaid operating conditions as determined by the code pattern of the control signal during a preceding mode-determining interval.

6. An encoding arrangement for a subscription telesion system comprising: encoding apparatus having a plurality of operating conditions for establishing a corresponding plurality of operating modes in said television system; an actuating system coupled to said encoding apparatus and responsive during any mode-determinng interval to an applied signal which may correspond to any of a series of different code patterns for selectively actuating said coding apparatus to a particular one of its aforesaid operating conditions in accordance with the pattern instantly represented by said control signal; a signal source for providing a signal having a random characteristic; means coupled to said source for deriving during each of a multiplicity of spaced mode-determining intervals a control signal including a series of code signal components collectively representing a code pattern determined at least in part by said random characteristic and varying from one mode-determining interval to another; and means for applying said control signal to said actuating system to effect actuation thereof to establish said encoding apparatus throughout respective spaced intervals intervening said mode-termining intervals in one of its aforesaid operating conditions as determined by the code pattern of the control signal during a preceding mode-determining interval.

7. An encoding arrangement for a subscription television system comprising: encoding apparatus having a plurality of operating conditions for establishing a corresponding plurality of operating modes in said television system and responsive during any mode-determining interval to the code pattern of an applied signal for selective actuation to one of its aforesaid operating conditions; a signal source for providing a signal having a random characteristic; means coupled to said source for deriving during each of a multiplicity of spaced mode-determining intervals a first control signal including a series of N components which individually and selectively represent one of at least two coding conditions and which collectively represent a first code pattern determined at least in part by said random characteristic and varying from one mode-determining interval to another; a corresponding series of N signal-translating channels; means for effectively applying each of said components of said control signal to a different assigned one of said channels to establish a signal condition in said channels corresponding to said code pattern; means including a conversion mechanism for deriving from said channels a second control signal representing a code pattern which may vary from one mode-determining interval to another and determined conjointly by said first code pattern and said conversion mechanism; and means for applying said second control signal to said encoding apparatus to establish said apparatus throughout respective spaced intervals intervening said mode-determining intervals in one of its aforsaid operating conditions as determined by the code pattern of said second control signal during a preceding mode-determining interval.

8. An encoding arrangement for a subscription television system comprising: encoding apparatus having a plurality of operating conditions for establishing a corresponding plurality of operating modes in said television system and responsive to the code pattern of an applied signal for selective actuation to one of its aforesaid operating conditions; means for deriving a series of N pulse components; means for effecting a random frequency division of said pulse components to derive from each of said series a first control signal including a series of N components which individually and selectively represent one of two coding conditions and which collectively represent a first code pattern which may vary from one operating interval to another; commutating means having a corresponding series of N commutating elements, and including scanning means for effectively applying each of said components of said control signal to a different assigned one of said elements to establish a signal condition on said elements corresponding to said first code pattern; a premutation mechanism comprising a series of multi-position switches respectively connected to said elements for deriving a second control signal representing a code pattern which may vary from one operating interval to another and which is determined conjointly by said first code pattern and by the operating positions of said switches; and means for applying said second control signal to said encoding apparatus.

9. An encoding arrangement for a subscription television system comprising: encoding apparatus having a plurality of operating conditions for establishing a corresponding plurality of operating modes in said television signal and responsive to the code pattern of an applied signal for selective actuation to one of its aforesaid operating conditions; means for deriving a first control signal including a series of N components which individually and selectively represent one of at least two coding conditions and which collectively represent a first code pattern; a cathode-ray commutating device having a corresponding series of N target elements, and including means for modulating the cathode-ray in said device in accordance with said first control signal, and means for scanning said cathode-ray over said elements effectively to apply each of said components of said control signal to a different assigned one of said elements to establish a signal condition on said elements corresponding to said first code pattern; means for deriving from said elements a second control signal representing a code pattern determined at least in part by said first code pattern; and means for applying said second control signal to said encoding apparatus.

10. An encoding arrangement for a subscription television system comprising: encoding apparatus having a plurality of operating conditions for establishing a corresponding plurality of operating modes in said television system; a signal source for providing a signal having a random characteristic; means coupled to said source for producing during each of a plurality of spaced mode-determining intervals a series of pulses; a control mechanism for selecting pulses from said series in accordance with a coding schedule to provide a control signal representing a code pattern determined at least in part by said random characteristic; and means for utilizing said control signal to establish the operating condition of said encoding apparatus throughout respective spaced intervals intervening said mode-determining intervals.

11. An encoding arrangement for a subscription television system comprising: encoding apparatus having a plurality of operating conditions for establishing a corresponding plurality of operating modes in said television system; a signal source for providing a signal having a random characteristic; means coupled to said source for producing a first control signal which includes a random number of pulse components which individually and selectively represent one of at least two coding conditions and which collectively represent a first code pattern; a conversion mechanism coupled to last-mentioned means for translating each of the said pulse components and for selectively transposing the representation of any such component as between said coding conditions to derive a second control signal representing a second code pattern determined at least in part by said first code pattern; and means for utilizing said second control signal to effect an actuation of said encoding apparatus from one to another of its operating conditions.

12. Apparatus for actuating an encoding device in a subscription television system comprising: means for deriving a control signal including a series of N components which individually represent one of at least two coding conditions and which collectively represent a code pattern; a cathode-ray commutating device having a corresponding series of N target elements, and including means for modulating the cathode-ray in said device in accordance with said control signal, and means for scanning said cathode-ray over said elements effectively to apply each of said components of said control signal to a different assigned one of said elements and establish a signal condition on said elements corresponding to said code pattern; and means coupled to said elements for utilizing said control signal to actuate said encoding device.

13. A subscription television transmitter comprising: a source for producing a television signal; a coding device coupled to said source having a plurality of operating conditions for establishing a corresponding plurality of operating modes in said transmitter effectively to code said television signal and responsive during any mode-determining interval to the code pattern of an applied signal for selective actuation to one of its aforesaid operating conditions; a signal source for providing a signal having a random characteristic, apparatus coupled to said source for deriving during each of a multiplicity of spaced mode-determining intervals a control signal including a series of code signal components collectively representing a code pattern determined at least in part by said random characteristic; means for utilizing said control signal to operate said coding device to establish said device throughout respective spaced intervals intervening said mode-determining intervals in one of its aforesaid operating conditions as determined by the code pattern of said control signal during a preceding mode-determining interval; and means for radiating the coded television signal and information representing said code pattern to subscriber receivers.

14. A subscription television transmitter comprising: a source for producing a television signal; a coding device coupled to said source having a plurality of operating conditions for establishing a corresponding plurality of operating modes in said transmitter effectively to code said television signal and responsive during any mode-determining interval to the code pattern of an applied signal for selective actuation to one of its aforesaid operating conditions; a signal source for providing a signal having a random characteristic apparatus coupled to said source for deriving during each of a multiplicity of spaced mode-determining intervals a first control signal including a series of code signal components collectively representing a first code pattern determined at least in part by said random characteristic; a conversion mechanism coupled to said apparatus for deriving in response to said first control signal a second control signal representing a code pattern determined conjointly by said first code pattern and by said conversion mechanism; means for applying said second control signal to said coding device to establish said device throughout respective spaced intervals intervening said mode-determining intervals in one of its aforesaid operating conditions as determined by the code pattern of said second control signal during a preceding mode-determining interval; means for transmitting the coded television signal to subscriber receivers; and means coupled to said apparatus for radiating to said receivers during each of said mode-determining intervals information designating the code pattern of said first control signal.

15. A subscription television transmitter comprising: a picture-converting device for developing during a series of line- and field-trace intervals video components; a synchronizing-signal generator for controlling said device and for developing during a series of interposed line- and field-retrace intervals line- and field-synchronizing components; a mixer amplifier coupled to said device and to said generator for producing a television signal including said video and synchronizing components; a coding device having a plurality of operating conditions for establishing a corresponding plurality of operating modes in said transmitter effectively to code said television signal and responsive during any mode-determining interval to the code pattern of an applied signal for selective actuation to one of its aforesaid operating conditions, apparatus for selecting a predetermined number of said line-synchronizing components during each of a multiplicity of spaced mode-determining intervals respectively occurring during at least a portion of each of said field-retrace intervals; means coupled to said apparatus for utilizing the selected synchronizing components to develop a control signal having a randomly varying characteristic and representing a code pattern; means for utilizing said control signal to operate said coding device to establish said device throughout respective spaced intervals intervening said mode-determining intervals in one of its aforesaid operating conditions as determined by the code pattern of said control signal during a preceding mode-determining interval; and means for transmitting the coded television signal to subscriber receivers.

16. A subscription television transmitter comprising: a picture-converting device for developing during a series of line- and field-trace intervals video components; a synchronizing-signal generator for controlling said device and for developing during a series of interposed line- and field-retrace intervals line- and field-synchronizing components; a mixed amplifier coupled to said device and to said generator for producing a television signal including said video and synchronizing components; a coding device having a plurality of operating conditions for establishing a corresponding plurality of operating modes in said transmitter effectively to code said television signal and responsive during any mode-determining interval to the code pattern of an applied signal for selective actuation to one of its aforesaid operating conditions; apparatus for selecting one of said line-synchronizing components and for also selecting an additional predetermined number N of said line-synchronizing components during each of a multiplicity of mode-determining intervals; control means coupled to said apparatus for utilizing said additional line-synchronizing components to develop a control signal including a series of N components which individually represent one of at least two coding conditions and which collectively represent a code pattern; a timing circuit coupled to said apparatus and utilizing said selected one of said line-synchronizing components to synchronize and control means; means for utilizing said control signal to operate said coding device; and means for transmitting the coded television signal to the subscriber receivers.

17. In a subscription television transmitter; a signal source for providing a signal having a random characteristic; apparatus coupled to said source for deriving during each of a multiplicity of spaced mode-determining intervals a first control signal including a series of code signal components collectively representing a first code pattern determined at least in part by said random characteristic; a conversion mechanism coupled to said apparatus for deriving in response to said first control signal a second control signal representing a code pattern determined conjointly by said first code pattern and by said conversion mechanism; means for radiating to subscriber receivers a key signal having a series of components occurring during each of said mode-determining intervals and representing said first code pattern; and means for utilizing said second control signal to control the mode of operation of said transmitter during respective spaced intervals intervening said mode-determining intervals.

18. A television receiver for utilizing a coded subscription television signal in which the mode of conveying program information varies in accordance with a coding schedule, comprising: an image-reproducing device; circuit means for supplying said television signal to said reproducing device; decoding apparatus coupled to said circuit means and having a plurality of operating conditions for establishing a corresponding plurality of operating modes in said receiver; an actuating system coupled to said decoding apparatus and responsive during any mode-determining interval to the code pattern of an applied signal for selectively actuating said decoding apparatus to one of its aforesaid operating conditions; a signal source for providing a signal having a random characteristic means coupled to said source for deriving during each of a multiplicity of spaced mode-determining intervals a control signal including a series of code signal components collectively representing a code pattern determined at least in part by said random characteristic and representing one mode of the television signal; and means for applying said control signal to said actuating system to establish operating modes in said receiver during respective spaced intervals intervening said mode-determining intervals, as determined by the code pattern of said control signal during a preceding mode-determinining interval, effectively to decode said television signal.

19. A television receiver for utilizing a coded subscription television signal in which the mode of conveying program information varies in accordance with a coding schedule, and for further utilizing a random-type key signal which during each of a multiplicity of spaced mode-determining intervals has a series of components representing a code pattern related to one mode of the received signal, said receiver comprising: an image-reproducing device; circuit means for supplying said television signal to said reproducing device; decoding apparatus coupled to said circuit means having a plurality of operating conditions for establishing a corresponding plurality of operating modes in said receiver and responsive during any mode-determining interval to the code pattern of an applied signal for selective actuation to one of its aforesaid operating conditions; means for receiving said key signal and for utilizing said key signal to produce during each of said mode-determining intervals a first control signal including a series of code signal components collectively representing a first code pattern determined at least in part by said random-type key signal and related to one mode of the received television signal; a conversion mechanism coupled to said last-mentioned means for deriving during each of said mode-determining intervals, in response to said first control signal, a second control signal representing a code pattern determined conjointly by said first code pattern and by said conversion mechanism and indicating one mode of the television signal; and means for applying said second control signal to said decoding apparatus to establish operating modes in said receiver during respective spaced intervals intervening said mode-determining intervals, as determined by the code pattern of said second control signal during a preceding mode-determining interval, effectively to decode said television signal.

20. In a subscription television system: an encoding device having at least two distinct operating conditions each of which establishes a different operating mode in said system; a cycling mechanism including counting means responsive to the application of a predetermined number of control pulses for executing a cycle of operations, said cycling mechanism having at least three operating steps in each such cycle; means coupling said cycling mechanism to said encoding device to actuate said device from one to another of its operating conditions as said mechanism advances from one to another of its operating steps; and means including a random-type pulse-signal source for supplying pulses to said cycling mechanism only during spaced mode-determining intervals for differently actuating said cycling mechanism during each of said mode-determining intervals.

21. In a subscription television system for translating a subscription television signal: an encoding device having at least two distinct operating conditions each of which establishes a different operating mode in said system; a pulse-signal source; a pulse-actuated cycling mechanism including first counting means and second counting means individually responsive to the application of a predetermined number of pulses for advancing from one to another of at least two operating steps in executing a cycle of operations and said second counting means having an operating frequency subharmonically related to that of said first counting means; means for supplying randomly occurring pulses from said source to said counting means only during spaced mode-determining intervals to randomly actuate said counting means during each of said mode-determining intervals; and means coupling at least one of said counting means to said encoding device to actuate said device from one to another of its operating conditions as said one counting means advances from one to another of its operating steps.

22. In a system for translating a subscription television signal having video components included within a recurring series of line-trace intervals constituting successive image fields and further having intervening line-synchronizing components: an encoding device having at least two distinct operating conditions each of which effectively establishes a different time relation between said video and synchronizing components of said television signal; a source for developing pulses individually representing a random one of said line-trace intervals occurring only within each of a multiplicity of spaced mode-determining intervals; a pulse-actuated cycling mechanism comprising a multi-step counting device having a number of operating steps integrally related to the number of operating conditions of said encoding device and small relative to the number of line-trace intervals per image field; means for coupling said counting device to said source to receive pulses therefrom for randomly actuating said counting device only during each of said mode-determining intervals; and means for coupling said counting device to said encoding device for effecting actuation of said encoding device between its aforesaid operating conditions as said counting device advances from one to another of its operating steps.

23. An encoding arrangement for a subscription television system comprising: an encoding mechanism including a first device having a plurality of operating conditions and a second device also having a plurality of operating conditions, said first and second devices individually establishing any one of at least two operating modes in said system and collectively establishing any one of at least four operating modes in said system as determined by their instant operating conditions; a first control means for controlling the operating condition of said first device; a second control means for controlling the operating condition of said second device; and means including a random-type pulse-signal source for supplying pulses to said first and second control means only during spaced mode-determining intervals for differently actuating said first and second control means during each of said mode-determining intervals.

24. An encoding arrangement for introducing any selected one of at least four different time relationships between the video and synchronizing components in a subscription television system comprising: a first and a second electron-discharge device of the beam type individually including, a source of electrons, means for forming electrons from said source into an electron beam, means for modulating said beam, a pair of beam-receiving electrodes, and deflecting means for selectively directing said beam to said beam-receiving electrodes; a first and a second delay line respectively connected between said beam-receiving electrodes of said first and second electron-discharge devices; an input circuit for impressing a video signal on said modulating means of said first device; a circuit coupling one of said beam-receiving electrodes of said first device to said modulating means of said second device; a pair of deflection control circuits for applying deflection signals to said deflecting means of said first and second devices to deflect the beams of said devices from one to another of their beam-receiving electrodes in accordance with a coding schedule; and an output circuit coupled to one of said beam-receiving electrodes of said second device to obtain a video signal which corresponds to said impressed video signal but has a timing relative thereto that varies at spaced time intervals between at least four different relationships in accordance with said coding schedule.

25. In a subscription television system: an encoding device having a plurality of operating conditions each of which establishes a different operating mode in said system; means for developing an encoding signal including a selected combination of signal components individually having a different predetermined identifying characteristic and collectively representing encoding information; means coupled to said developing means for separating said signal components from one another; means coupled to said separating means for permuting at least some of the separated signal components; a control mechanism coupled to said encoding device to effect actuation thereof between its aforesaid operating conditions; and means for utilizing the permuted signal components to operate said control mechanism and control the operating mode of said system.

26. A subscription television transmitter for transmitting a coded television signal comprising: a coding device having a plurality of operating conditions each of which establishes a different operating mode in said transmitter, an actuating mechanism for said device; means for applying a combination of pulse components to said actuating mechanism to actuate said mechanism for varying the operating condition of said coding device effectively to code said television signal; means for developing a second combination of pulse components individually having a different predetermined identifying characteristic and collectively including at least a counterpart for each pulse of the first-mentioned combination; and means for transmitting said coded television signal and said second combination of pulse components to subscription receivers.

27. A subscription television receiver for utilizing a television signal coded in accordance with a coding schedule and including a combination of encoding signal components, individually having a different predetermined frequency characteristic, related to said coding schedule, said receiver, comprising: a decoding device having a plurality of operating conditions each of which establishes a different operating mode in said receiver; and actuating mechanism for said device; means for deriving said combination of encoding signal components from said television signal; means for separating said encoding signal components from one another; means coupled to said separating means for permuting at least some of the separated signal components; and means for utilizing the permuted signal components to actuate said mechanism to vary the operating condition of said decoding device effectively to decode said television signal.

28. An encoding signal generator for a subscription television transmitter comprising: means for developing a series of pulses collectively representing a predetermined code schedule; a series of generators individually producing a signal having a different predetermined identifying frequency; and means coupled to said pulse-developing means for randomly actuating said generators to develop a combination of encoding signal components each having a different identifying frequency and collectively representing said code schedule.

29. The method of subscription telecasting which comprises: deriving a television signal representing video information; developing during each of a series of spaced mode-determining intervals a combination of signal pulses representing encoding information; utilizing said combination of signal pulses to code said television signal during intervals intervening said mode-determining intervals; developing during each of said mode-determined intervals a second combination of signal pulses related to said first-mentioned combination but which in certain of such intervals include numerically more pulses than in such first-mentioned combination; and radiating said coded signal and said second combination of signal pulses to subscriber receivers.

30. The method of subscription telecasting which comprises: deriving a television signal representing video information; developing during each of a series of spaced mode-determining intervals a combination of signal pulses representing encoding information; utilizing said combination of signal pulses to code said television signal during intervals intervening said mode-determining intervals; developing during each of said mode-determining intervals a second combination of signal pulses individually having a different predetermined identifying frequency and collectively related to said first-mentioned combination but including numerically more pulses than in said first-mentioned combination; and radiating said coded signal and said second combination of signal pulses to subscriber receivers.

31. In a subscription television system for translating a subscription television signal: an encoding device having a plurality of operating conditions each of which establishes a different operating mode in said system; a control mechanism coupled to said encoding device for effecting actuation thereof between said operating conditions; means for deevloping a combination of encoding signal components individually having a different predetermined identifying characteristic and collectively representing at least a portion of an encoding schedule; means coupled to said developing means for permuting at least some of said encoding signal components; and means for utilizing the permuted signal components to control the operation of said control mechanism in accordance with said encoding schedule effectively to encode said television signal.

32. An encoding arangement for a subscription television system comprising: encoding apparatus having a plurality of operating conditions for establishing a corresponding plurality of operating modes in said television system and responsive during any mode-determining interval to the code pattern of an applied signal for selective actuation to one of its aforesaid operating conditions; means for deriving during each of a multiplicity of spaced mode-determining intervals occurring during a program interval a first control signal including a series of components collectively representing a first code pattern; a conversion mechanism coupled to said means for effecting one conversion operation on said first control signal during certain ones of said mode-determining intervals and another conversion operation on said first control signal during certain other ones of said mode-determining intervals to develop a second control signal representing a second code pattern determined conjointly by said first control pattern and said conversion operations; and means for applying said second control signal to said encoding apparatus.

33. A subscription television system comprising: encoding apparatus for establishing said system in a plurality of different operating modes; means for deriving during each of a series of spaced mode-determining intervals a code signal which, in each such interval, has a pattern of characteristic variations representing a selected one of said operating modes and which may vary as to mode representation from one such interval to the next; and means for examining the pattern of characteristic variations of said code signal during each of said mode-determining intrevals to determine the operating mode represented thereby and for effecting actuation of said encoding apparatus in accordance with such mode representations.

34. A subscription television system for translating a television signal comprising: a multiplicity of code-determining circuits; a plurality of switches individually having a plurality of operating positions and collectively establishing different prescribed ones of a multiplicity of different interconnection patterns between said circuits in accordance with the instantaneous positions of each of said switches with respect to one another, said switches being individually adjustable relative to one another to permit selection of any one of said multiplicity of different interconnection patterns; a signal source for providing a control signal having a random characteristic; means coupled to said source and including said switches for developing an encoding signal having a characteristic which varies in accordance with a predetermined code schedule determined in part by the interconnection pattern established by said switches and in part by the random characteristic of said control signal; and means coupled to said last-mentioned means for utilizing said encoding signal to encode said television signal.

*35. In transmitting means for a scrambled picture transmission system, means for generating picture signals, means coupled thereto for generating a plurality of different modes of said picture signals, and means coupled to and responsive to the aforesaid means for transmitting a different mode of the picture signals during different time periods at a rate sufficient to render an unauthorized receiver display unintelligible, means including commutation means having a plurality of different states for selecting from time to time which of said modes is transmitted, means for generating and transmitting coded complex signal combinations for maintaining synchronization of commutation means at receivers, and changeable matrix means connected between the means for generating said coded complex signal combinations and the transmitter commutation means for determining which mode is transmitted for a given state of the transmitter commutation means.*

*36. In receiving means for receiving a scrambled picture transmission wherein picture signals are transmitted in one of a plurality of different modes during different time periods which occur at a rate sufficient to render an unauthorized receiver display unintelligible and wherein coded complex signal combinations are transmitted representing the operation of commutation means at the transmitting means; means for resolving the different modes of*

*said picture signals, means coupled to said resolving means and including commutation means for determining from time to time the mode resolved in the resolution means, means for detecting the transmitted coded complex signal combinations for maintaining synchronization of the receiver commutation means with corresponding commutation means at the transmitting means, and changeable matrix means connected between the detecting means and the receiver commutation means for determining the mode to be resolved for given states of the commutation means.*

References Cited by the Examiner

The following references, cited by the Examiner, are of record in the patented file of this patent or the original patent.

UNITED STATES PATENTS

| | | | |
|---|---|---|---|
| 2,405,252 | 8/46 | Goldsmith | 178—5.1 |
| 2,472,774 | 6/49 | Mayle | 178—5.1 XR |
| 2,510,046 | 5/50 | Ellett | 178—5.1 |
| 2,521,010 | 9/50 | Homrighous | 178—5.1 |
| 2,531,974 | 11/50 | Ellett | 178—5.1 |
| 2,543,116 | 2/51 | Llewellyn | 178—5.1 |
| 2,545,770 | 3/51 | Ellett | 178—5.1 |
| 2,547,598 | 4/51 | Roschke | 178—5.1 |
| 2,656,406 | 10/53 | Gray et al. | 178—5.1 |
| 2,656,407 | 10/53 | Herrick et al. | 178—5.1 |

DAVID G. REDINBAUGH, *Primary Examiner.*

NEWTON N. LOVEWELL, *Examiner.*